Feb. 10, 1931.  R. D. GIVEN  1,792,296
CONTROL OF ELECTRIC MOTORS
Filed June 17, 1926
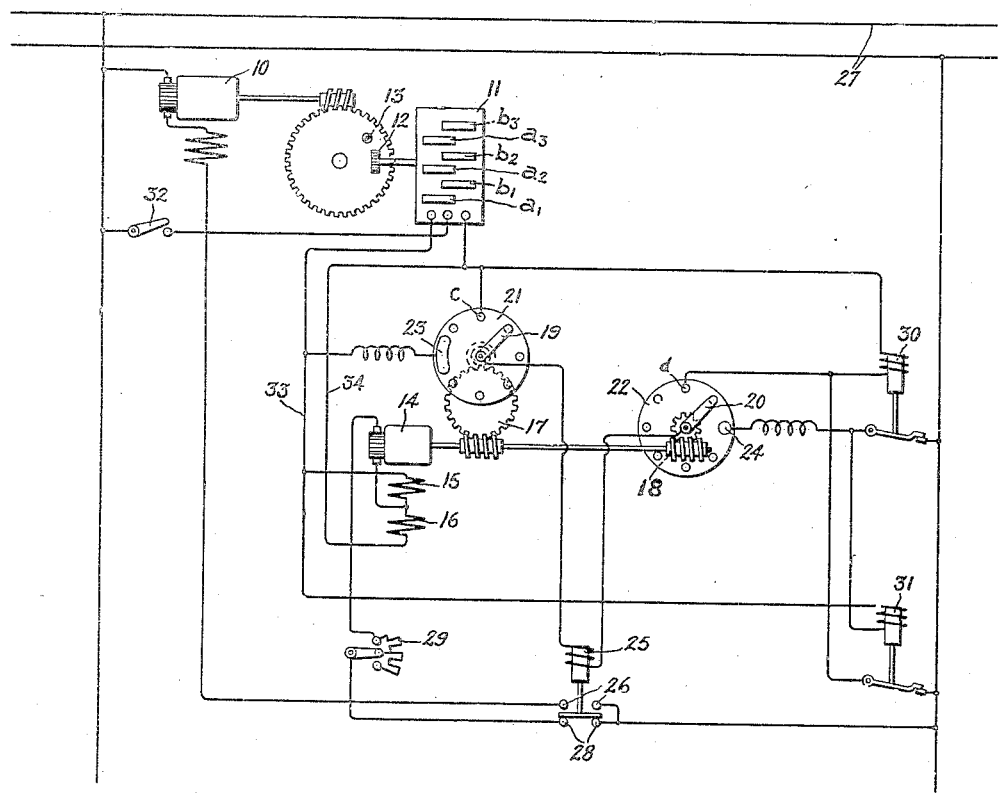
Inventor:
Ralph D. Given;
by *[signature]*
His Attorney.

Patented Feb. 10, 1931

1,792,296

UNITED STATES PATENT OFFICE

RALPH DAVID GIVEN, OF LEAMINGTON SPA, ENGLAND, ASSIGNOR TO GENERAL ELECTRIC COMPANY, A CORPORATION OF NEW YORK

CONTROL OF ELECTRIC MOTORS

Application filed June 17, 1926, Serial No. 116,581, and in Great Britain July 1, 1925.

This invention relates to the control of electric motors, and more particularly to the provision of means whereby a motor can be started and stopped intermittently at regular intervals. In certain types of manufacturing apparatus, as for example in paint grinders, sugar washers, or the like, frequently it is necessary to provide an electric driving motor which is automatically controlled so as to be successively operated for a time interval and maintained at rest for a time interval, the length of the time intervals being variable to meet varying service conditions.

The object of my present invention is to provide an improved time element control mechanism which automatically will start and stop a motor at recurring time intervals and, moreover, will allow a very wide range of adjustment in the periods of rest, as well as the periods of operation of the motor.

In carrying the invention into effect in a preferred form an electroresponsive timing device, preferably driven by a pilot motor, is provided with a pair of cooperating switch arms which are rotated at different but proportionate speeds. The two cooperating switch arms are adapted to complete one control circuit after a predetermined operation thereof in one direction and to establish a different control circuit after a predetermined rotation thereof in the reverse direction. By arranging switch mechanism actuated by the driving motor to cooperate with the electroresponsive time element device in controlling an electroresponsive line switch for the motor so as to maintain the driving motor circuit closed for a time interval and to maintain the motor circuit interrupted for a time interval, the driving motor may be operated and maintained at rest intermittently for recurring time intervals.

The invention will be more readily understood by reference to the accompanying drawing in which the single figure is a schematic diagram of a time element motor control system embodying a preferred form of the invention.

In the drawing the driving motor 10 is shown of the direct current series type and it will be understood is suitably connected by means not shown to drive the industrial apparatus, such as a paint grinder, sugar washer, or the like. The driving motor 10 also is connected through suitable worm gearing as indicated in the drawing to operate the drum switch 11 by means of the star-wheel 12 and the operating pin 13. The arrangement is such that the drum switch 11 is operated to each of the positions $a_1$, $b_1$, $a_2$, $b_2$, $a_3$, $b_3$, after successive predetermined rotations of motor 10.

An electroresponsive timing device comprising, as illustrated, the reversible pilot motor 14 having split field windings 15 and 16, is connected through suitable gearing 17 and 18 to drive the rotatable switch arms 19 and 20. The arms 19 and 20 cooperate respectively with the studded contact disks 21 and 22. The gearing 17 and 18, through which the rotating arms 19 and 20 are driven, is so arranged that the arm 20 may make a complete revolution while the arm 19 is moving from one stud on the disk 21 to the next stud. The contact studs on the disk 21 and 22 are arranged so that connection may be made with any selected one of the contact studs by means of the adjustable plugs 23 and 24. Adjustment of these plugs enable the interval of time during which the main motor 10 is maintained at rest to be varied in the manner explained more in detail hereinafter.

The rotating contact arms 19 and 20 jointly control the energization of the electroresponsive switch 25 which, when energized, engages with the contacts 26 to complete the energizing circuit for the motor 10 from the supply lines 27. When the electroresponsive switch 25 is deenergized its contact is biased to engage the stationary contacts 28 and thereby partially complete an energizing circuit for the pilot motor 14 with the adjustable speed regulating resistance 29 in the pilot motor circuit. The electroresponsive switches 30 and 31 function to control the energization of the switch 25 through the contact studs $d$ and the adjustable contact plug 24 in a manner which will be more fully described in connection with the operation of the control system.

The operation of the control system is as follows: At the commencement of each cycle of operation the rotatable contact arms 19 and 20 are in engagement with the studs $c$ and $d$ respectively. If now the manual control switch 32 is closed and the controller 11 is in the position $a_1$ an energizing circuit for the pilot motor 14 is established from the upper supply line 27 through the control switch 32, the contact $a_1$ of controller 11, conductor 33, split field winding 15 and the armature of pilot motor 14, the adjustable resistor 29 and the contacts 28, to the other supply line. This sets the pilot motor 14 into operation to rotate the switch arms 19 and 20 in a clockwise direction. At the same time the operating winding of switch 31 is energized from the conductor 33 through the contact of switch 30 and the switch 31 is operated to the open position to prevent cross-connections between the circuit through contact $d$ and the circuit through contact 24.

While the switch arms 19 and 20 are being rotated by the pilot motor 14 in the clockwise direction, the main motor 10 remains at rest. After the motor 14 has operated for a sufficient length of time to engage the rotating arms 19 and 20 with the adjustable contact plugs 23 and 24 respectively, the operating winding of switch 25 is energized and the switch responds to interrupt the energizing circuit of the pilot motor 14 and establish the energizing circuit of the main driving motor 10. Thereupon the main driving motor 10 starts and continues to operate until the gearing connection with the controller 11 brings the operating pin 13 into engagement with the star-wheel 12 to advance the controller 11 into position $b_1$. The time interval required for this operation depends entirely upon the gearing through which the driving motor 10 is connected to operate the controller 11 and obviously may be varied as desired.

When the controller 11 is advanced from the position $a_1$ to the position $b_1$, the energizing circuit for the switches 31 and 25 is interrupted and the latter switch is operated out of engagement with the contacts 26 and into engagement with the contacts 28. This interrupts the energizing circuit for the main driving motor 10. At the same time the pilot motor 14 is re-energized through the contact $b_1$ of controller 11, the conductor 34 and the split field winding 16, the resistance 29, and the contacts 28. With the pilot motor 14 energized through the split field winding 16, the switch arms 19 and 20 are rotated in a counter-clockwise direction. Simultaneously with the energization of the pilot motor, an energizing circuit for switch 30 is established through the contact $b_1$ and the contact of switch 31 and the switch 30 responds to open the circuit to the adjustable plug 24, and thereby prevent cross-connections between the two energizing circuits for switch 25.

After the operation of the pilot motor 14 for a sufficient interval to return the switch arms 19 and 20 to the initial or zero position, that is, into engagement with the contacts at $c$ and $d$, the switch 25 again is energized, the circuit extending through the contact $b_1$ of controller 11, contact studs $c$, rotatable arm 19, operating winding of switch 25, the rotating arm 20, contact $d$ and the contact of switch 31. This results in the operation of switch 25 to interrupt the circuit of the pilot motor 14 and re-establish the energizing circuit of the main driving motor 10.

The main driving motor 10 again continues to operate until the controlled 11 is operated from position $b_1$ to position $a_2$ through the agency of the operating pin 13 and the star-wheel 12. Thereupon the cycle of operation previously described is repeated, the pilot motor 14 and the rotating switch arms 19 and 20 serving to determine the period during which the main driving motor 10 remains at rest and the star-wheel 12 and operating pin 13, together with the gearing through which the latter is driven determining the period during which the motor 10 is operated.

As previously pointed out, the timing of the period of operation of motor 10 may be varied by changing the ratio of the gearing through which the operating pin 13 is driven. The timing of the period during which the motor 10 remains at rest depends upon the speed of the pilot motor 14 and also upon the position of the adjustable contact plugs 23 and 24. The speed of the pilot motor 14 may be adjusted by means of the rheostat 29 in the usual manner. The timing adjustment of the plugs 23 and 24 may be as follows: If, for example, switch arm 20 is connected to be driven by the pilot motor so as to make one complete revolution in 16 minutes and is provided with 8 studs as illustrated, then each stud will correspond to 2 minutes. As the other rotatable arm 19 makes one complete revolution for each two minute stud of disk 22 and is provided with 8 studs as illustrated, the interval of time corresponding to each stud on disk 21 will be 15 seconds. Thus, if the adjustable plugs 23 and 24 are inserted in the disks 21 and 22 so as to make contact with the first stud, the interval of time during which the pilot motor 14 will run will be two minutes and 15 seconds. Further subdivisions in the time intervals can be obtained either by increasing the number of studs in the disks or by varying the relative gearing ratio at which the rotating arms 19 and 20 are operated.

While I have illustrated and described my invention embodied in a preferred form of apparatus, it will be understood that the apparatus may be modified in various ways without departing from the true spirit and scope of the invention.

What I claim as new and desire to secure by Letters Patent of the United States, is:

1. A motor control system comprising a main electric motor, an electroresponsive switch biased to one circuit closing position and operable to a second circuit closing position to establish power connections for said main motor, a reversible motor operated adjustable timing device having a pair of rotatable circuit controlling members connected to be driven at different angular speeds between a plurality of circuit closing positions, a portion of said positions being adjustable, a reversing switch connected to be driven between its different positions by the main motor upon predetermined operations thereof, connections jointly controlled by said reversing switch and said electroresponsive switch in the biased position thereof for establishing an energizing circuit for the driving motor of said timing device to start operations thereof after each of said predetermined operations of the main motor, and connections jointly controlled by said reversing switch and the pair of rotatable circuit controlling members of said timing device in each of a plurality of the said circuit closing positions thereof, for establishing an energizing circuit for said electroresponsive switch to start operation of said main motor after recurring time intervals determined by the adjustment of said timing device.

2. A motor control system comprising a main electric motor, an electroresponsive switch biased to one circuit closing position and operable to a second circuit closing position to establish power connections for said main motor, a reversible motor operated adjustable timing device having a pair of dial switches, each having a rotatable contact operable between a plurality of circuit controlling positions, said contacts being interconnected so that one of the contacts passes through each of its positions, while the other contact is in each of its positions, a portion of the positions of each of its dial switches being adjustable, a reversing switch connected to be operated between its different positions by the main motor upon predetermined operations thereof, connections jointly controlled by said reversing switch and said electroresponsive switch in the biased position thereof for establishing an energizing circuit for the driving motor of said timing device to start operation thereof after each of said predetermined operations of the main motor, connections jointly controlled by said reversing switch and the rotatable contacts of said dial switches in each of a plurality of the said circuit controlling positions thereof for establishing an energizing circuit for said electroresponsive switch to start operation of said main motor after recurring time intervals determined by the adjustment of said timing device, and electroresponsive switch mechanism connected to be energized under the control of said reversing switch for preventing cross-connections between said energizing circuits.

In witness whereof, I have hereunto set my hand this twenty-eighth day of May, 1926.

RALPH DAVID GIVEN.